(12) United States Patent
Andersson

(10) Patent No.: US 7,451,551 B2
(45) Date of Patent: Nov. 18, 2008

(54) GYROSCOPE PRODUCTION METHOD AND CONFIGURATION OF GYROSCOPE THUS PRODUCED

(75) Inventor: Thomas Andersson, Täby (SE)

(73) Assignee: PKMTRICEPT S.L., Noain (Navarra) (ES)

(*) Notice: Subject to any disclaimer, the term of this patent is extended or adjusted under 35 U.S.C. 154(b) by 137 days.

(21) Appl. No.: 10/580,072

(22) PCT Filed: Nov. 16, 2004

(86) PCT No.: PCT/ES2004/000508

§ 371 (c)(1),
(2), (4) Date: May 22, 2006

(87) PCT Pub. No.: WO2005/050037

PCT Pub. Date: Jun. 2, 2005

(65) Prior Publication Data

US 2007/0079515 A1   Apr. 12, 2007

(30) Foreign Application Priority Data

Nov. 20, 2003   (SE) .................................... 0303089

(51) Int. Cl.
  *F16C 11/06*   (2006.01)
  *G01C 1/00*   (2006.01)
(52) U.S. Cl. .............................. 33/706; 33/1 N; 33/534
(58) Field of Classification Search ............... 33/1 N, 33/1 PT, 534, 538, 706, 707, 708
See application file for complete search history.

(56) References Cited

U.S. PATENT DOCUMENTS

| 3,128,554 | A | * | 4/1964 | Borden | 33/1 N |
| 3,748,912 | A | * | 7/1973 | Hildebrand | 74/5 F |
| 3,769,710 | A | * | 11/1973 | Reister | 33/320 |
| 5,813,124 | A | * | 9/1998 | Freitag | 33/1 N |
| 6,301,525 | B1 | * | 10/2001 | Neumann | 700/245 |
| 6,931,745 | B2 | * | 8/2005 | Granger | 33/503 |

FOREIGN PATENT DOCUMENTS

JP   04147726 A   *   5/1992

* cited by examiner

*Primary Examiner*—R. A. Smith
(74) *Attorney, Agent, or Firm*—McDonnell Boehnen Hulbert & Berghoff LLP

(57) ABSTRACT

The invention relates to a gyroscope production method and to the configuration of a gyroscope thus produced. More specifically, the invention relates to a method of producing a base (15, 35) for a scale (24, 44) on a gyroscopic ring (3, 7) belonging to a gyroscopic suspension of an arm of a parallel kinematic machine, said gyroscopic ring (3, 7) being provided with bearing pins (5, 9). According to the invention, the bearing pins (5, 9) are worked in a secure fixed state and the base (15, 35) for the scale (23) is also worked in the same fixed state, without said state being changed between the working of the bearing pins (5, 9) and that of the base (15) for the scale (24, 44). The invention also relates to a scale configuration produced using the aforementioned method.

11 Claims, 2 Drawing Sheets

GYROSCOPE PRODUCTION METHOD AND CONFIGURATION OF GYROSCOPE THUS PRODUCED

FIELD OF INVENTION

The present invention relates to parallel-kinematic machines, for example tripods and hexapods, and then particularly to the gyroscopic suspension of an arm that supports the positioning head of such a machine.

BACKGROUND OF THE INVENTION

A parallel-kinematic machine of this kind described in U.S. Pat. No. 6,301,525 (corresponds to SE 512 338) includes a universal joint in the form of a gyro suspension that includes a central through-passing hole which is intended to receive an axially displaceable arm which is connected at one end to a positioning head.

With the intention of enhancing the accuracy of positioning head settings in space with regard to the aforesaid type of machine, its universal joint is provided with two angle sensors. A first angle sensor is connected to the first shaft of the universal joint and a second angle sensor is connected to the second shaft of said joint. These sensors detect the angular position of the gyro rings of the joint. The arm carries a length sensor which detects the axial position of the arm in the universal joint.

The angular positions of the gyro rings included in the gyro suspension in relation to a foundation are read-off with the aid of scale markings disposed on a graduated surface, which is either in the form of a curved cylindrical surface or a plain circular surface within each angle sensor, wherein the graduations define a curved scale. The radius of each angle sensor on the curved scale is normally less than 50 mm. Because the angular resolution is inversely proportional to the scale radius, the relatively short radius of this scale results in low resolution with regard to positioning head accuracy.

It is not technically and economically realistic to further enhance the resolution of the sensors by simply increasing the scale radius, since the errors that result when mounting the scale and the errors that result from scale manufacture will increase in proportion to an increase in the radius, making further enhancement of the accuracy unachievable in this way.

Due to the difficulties experienced in fitting the cylindrical surface concentrically with the shaft of the gyro ring, an angular error is also obtained between the cylindrical surface and the shaft pivot.

At these small radii and tolerances vibrations from bearings and guide rails, which have a size in the order of 0.5 μm, are sufficient to introduce errors into the system.

OBJECT OF THE INVENTION

The object of the present invention is lo provide a method of enhancing accuracy and stability with regard to determining the angular positions of the gyro rings in a machine of the aforesaid kind.

Another object is to provide a stiffer gyro ring with improved tolerances.

Another object of the present invention is to provide an arrangement in accordance with said method.

A further object of the present invention is to provide a so-called tool resolution of the machine that is five times better than the tool resolution obtained with conventional technology.

SUMMARY OF THE INVENTION

These objects are fulfilled by the present invention as defined in the independent claims. Suitable embodiments of the invention will be apparent from the dependent claims.

The invention relates to a method of producing a scale foundation or of applying directly a scale that has a higher resolution than has earlier been possible in connection with a parallell-kinematic machine. The method is based on securely fixing, e.g. clamping, the gyro ring of a gyro suspension mounting in a machine for machining the gyro ring bearing pins and said foundation and/or scale in one and the same operational state.

Etching of the scale directly onto the foundation is also conceivable within the scope of the invention.

In order to obtain the resolution envisaged, the radius of the foundation-carried curved scale shall lie in the range of 100-300 mm, and will preferably be 200 mm.

With regard to a gyro suspension mount, the shaft bearings of the gyro rings and the scale foundation and possibly also the scale are worked in one and the same fixed state.

The invention also relates to an arrangement produced in accordance with the aforesaid method.

BRIEF DESCRIPTION OF THE DRAWINGS

The invention will now be described in more detail with reference to an exemplifying embodiment thereof and with reference to the accompanying drawings, in which.

DESCRIPTION OF THE INVENTION

Figure 1:
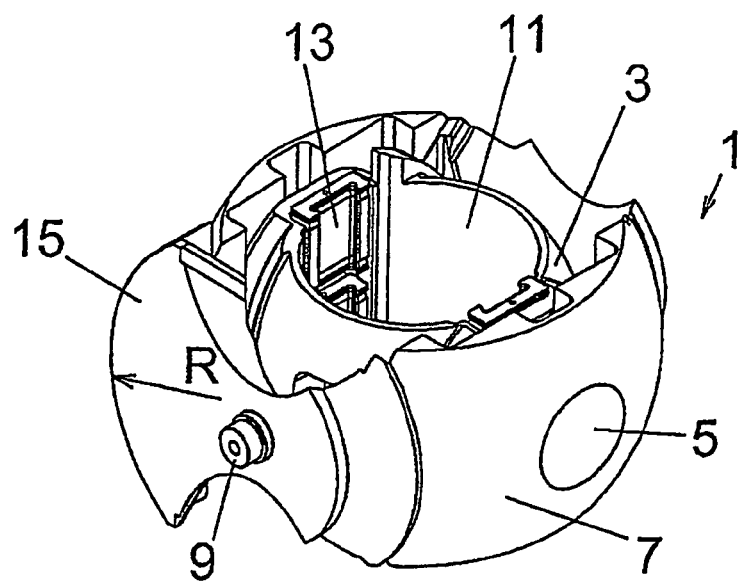
FIG. 1 is a perspective view of a gyro arrangement according to a first embodiment of the invention.

FIG. 1 illustrates a gyro suspension 1 comprising an inner gyro ring 3 mounted in internal bearing pins 5 that are journaled in an outer gyro ring 7. The outer gyro ring 7 is provided with outer bearing pins 9 which are journaled in a foundation that supports the entire gyro suspension. As will also be seen from the figure, the inner gyro ring includes a through-penetrating hole 11 in which an axially displaceable arm is able to slide. The arm is guided in the hole 11 with the aid of guide rails 13. Concentrical with one outer bearing pin 9 is a foundation 15, which is disposed on the outer gyro ring 7 and provided with a surface in the form of a sector of a cylinder such as to form a scale. This surface is obtained by machining he outer gyro ring 7 on a lathe to a radius R where is R is 200 mm.

Figure 2:
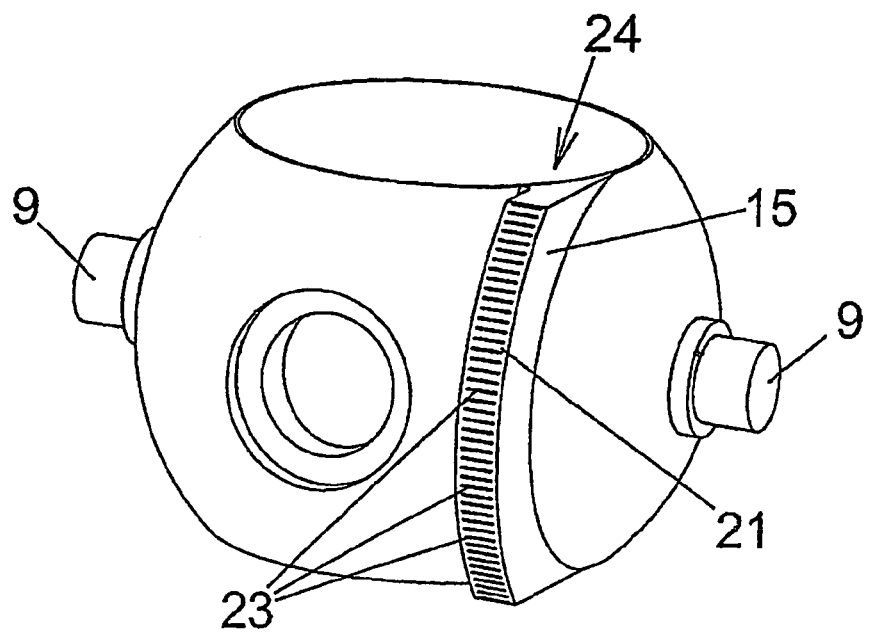
FIG. 2 is a schematic view of an alternative first embodiment of a foundation or substrate provided with a scale in accordance with the invention.

FIG. 2 shows he foundation 15 carried by the gyro ring 7 and on which the aforesaid surface 21 is disposed. Scale markings 23 are fixed directly on the surface 21, preferably etched thereon, to form a scale 24 in the form of a cylinder sector. The scale markings are configured so that they can be read by a reader, which in the case of this embodiment has a reading direction generally at right angles to the rotational axis of the shaft bearings 9 in relation to the scale.

Figure 3:
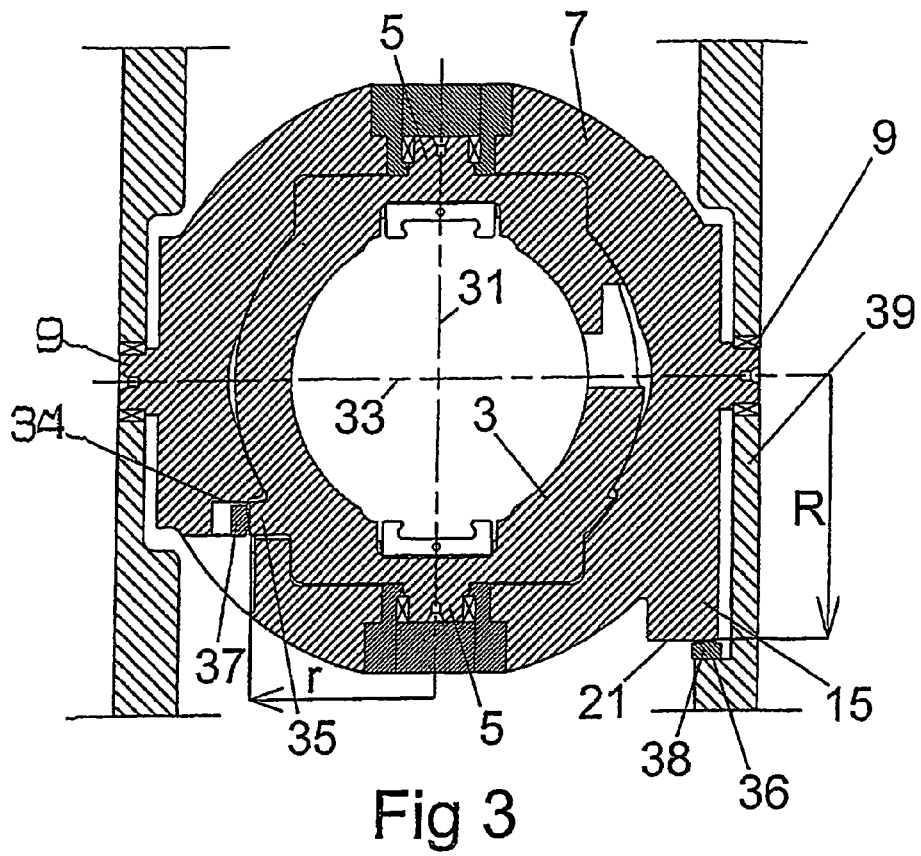
FIG. 3 is a sectional view of the shaft bearings according to FIG. 1, and also shows parts of a foundation.

The design according to FIG. 2 also applies to the inner gyro ring 3 with regard to the foundation, the cylinder sector surface, the scale markings, the scale and the reader FIG. 3 is a sectional view taken in a plane through the outer bearing pins on the outer gyro ring 7 and through the inner bearing pins 5 on the inner gyro ring 3. As will be clearly seen from the figure, the rotational axes 31 of the inner bearing pins intersect the rotational axes 33 of the outer bearing pins at a right angle. As before mentioned, the inner gyro ring 3 is provided with a foundation 35 in a manner corresponding to the outer gyro ring 7, wherein the foundation 35 includes a corresponding cylinder-sector surface which is also provided with scale markings so as to form a cylinder-sector shaped scale, for instance a scale produced in the same way as that mentioned above with respect to the outer foundation. This inner cylinder-sector surface has a radius r of 150 mm. Opposite the cylinder-sector surface of the inner foundation 35 there is mounted in the outer gyro ring 7 an inner reader 37 which has a fixed connection with a first reference surface 34. An outer reader 38 is mounted in the foundation 39 opposite the cylinder-sector surface 21 of the outer foundation 15, said reader having a fixed connection (to a second reference surface 36 in the foundation. The two readers 37, 38 are adapted to read the scale markings on respective foundations 15, 35 and both readers are mounted to define a gap relative to the foundations/scale markings. It will also be evident from the figure that the two scale-carrying foundations are worked directly in the material of respective gyro rings and that the work is carried out in one and the same fixed state of the rings. The radial throw between the shaft bearings an the cylinder-sector surfaces will therewith be at a minimum.

Movement of the arm, and therewith (the position of the positioning head in space, will be determined by the values from these three sensing arrangements, as a result of co-action between said two readers and a length sensor (not shown).

Figure 4:
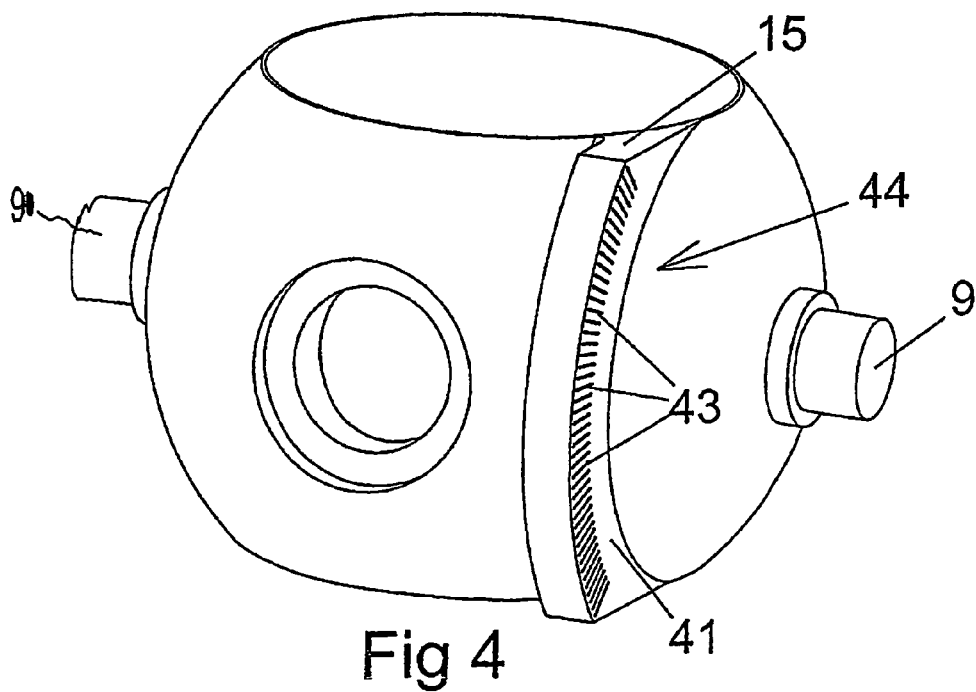
FIG. 4 is a schematic view of a second embodiment of a foundation provided with a scale in accordance with the invention.

FIG. 4 shows an alternative embodiment of the foundation 15 on the outer gyro ring shown in FIG. 2, wherewith the foundation 15 is arranged as a planar disc-shaped circle-sector surface 41. Scale markings 43 are fixed directly to the surface 41, for instance etched thereon, to form a circle-sector shaped scale 44. The scale markings are configured in a corresponding manor so that they can be read by a reader, which in the case of this embodiment has a reading direction that is generally parallel with the rotational axis of the shaft bearings 9 in relation to the scale. The embodiment of the foundation for the circle-sector shaped scale illustrated in FIG. 4 and also the alternative embodiment of said foundation described above also apply to the inner gyro ring 3.

The invention claimed is:

1. A method of producing a foundation for a scale on a gyro ring in a gyro suspension of an arm in a parallel-kinematic machine, wherein the gyro ring is provided with bearing pins which are worked in a securely fixed state, characterized in that the scale-carrying foundation is worked in one and the same fixed state without changing the fixed state between working of the bearing pins and working of the foundation carrying the scale.

2. A method according to claim 1, characterized by working the foundation and the bearing pins in the form of a lathe-turning operation and/or a grinding operation.

3. A method according to claim 1, characterized in that work on the foundation and work on the bearing pins is effected simultaneously.

4. A method according to claim 1, characterized in that scale markings for the scale are provided in the foundation in one and the same fixed state without changing said state.

5. A scale arrangement produced by a method according to claim 1, wherein the arrangement includes scale markings which form the scale on the gyro ring for gyro suspension of the arm in the parallel-kinematic machine, said gyro ring being provided with the bearing pins, said bearing pins being cylindrical, characterized in that the foundation for said scale markings is formed in the gyro ring either as a cylinder-sector surface or as a planar circle-sector surface on which the scale markings are disposed.

6. An arrangement according to claim 5, characterized in that the scale formed by the scale markings on the foundation is either cylinder-sector shaped or circle-sector shaped, said scale being placed concentrically with the bearing pins.

7. An arrangement according to claim 6, characterized in that the scale formed by the scale markings on the foundation is disposed externally on the cylinder surface.

8. An arrangement according to claim 6, characterized in that the scale is disposed on the planar circle-sector surface.

9. An arrangement according to claim 5 characterized in that the foundation is comprised of part of the gyro ring.

10. An arrangement according to claim 5, characterized by a reader which is mounted to define a gap with the scale such that the reader will register the angular position of the gyro ring in relation to a reference surface.

11. An arrangement according to claim 10, further comprising a second, outer gyro ring, characterized in that the reference surface is located in the foundation and/or on the outer-gyro ring.

* * * * *